(12) United States Patent
Greggs

(10) Patent No.: US 11,352,065 B2
(45) Date of Patent: Jun. 7, 2022

(54) VEHICLE BODY STRUCTURE

(71) Applicant: Nissan North America, Inc., Franklin, TN (US)

(72) Inventor: Alan Greggs, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 289 days.

(21) Appl. No.: 16/445,872

(22) Filed: Jun. 19, 2019

(65) Prior Publication Data

US 2020/0398903 A1     Dec. 24, 2020

(51) Int. Cl.
| | |
|---|---|
| *B62D 25/04* | (2006.01) |
| *B60R 22/195* | (2006.01) |
| *B62D 25/20* | (2006.01) |
| *B60R 22/22* | (2006.01) |
| *B60R 22/24* | (2006.01) |

(52) U.S. Cl.
CPC .......... *B62D 25/04* (2013.01); *B60R 22/1951* (2013.01); *B60R 22/22* (2013.01); *B60R 22/24* (2013.01); *B62D 25/2036* (2013.01)

(58) Field of Classification Search
CPC .............. B60R 22/195; B60R 22/1951; B60R 22/1954–1957; B60R 22/185; B60R 22/34; B60R 22/46; B60R 22/4604; B60R 2202/4666; B62D 25/04
USPC ........ 280/805, 806; 297/479, 480, 474, 483; 296/193.06

See application file for complete search history.

(56) References Cited

U.S. PATENT DOCUMENTS

| | | | | |
|---|---|---|---|---|
| 6,874,817 | B2 * | 4/2005 | Nakano | B60R 22/1952 |
| | | | | 280/805 |
| 8,353,531 | B2 * | 1/2013 | Miyajima | B60R 21/205 |
| | | | | 280/732 |
| 8,814,211 | B1 | 8/2014 | Kohlndorfer et al. | |
| 8,888,137 | B2 | 11/2014 | Rao et al. | |
| 9,517,749 | B2 * | 12/2016 | Iguchi | B62D 25/08 |
| 10,000,181 | B2 | 6/2018 | Kim | |
| 10,259,426 | B2 | 4/2019 | Kohlndorfer et al. | |
| 2013/0146697 | A1 * | 6/2013 | Kim | B60R 22/34 |
| | | | | 242/379 |

FOREIGN PATENT DOCUMENTS

| | | | | | |
|---|---|---|---|---|---|
| EP | 2218614 | A1 * | 8/2010 | ......... | B60R 22/1951 |
| JP | H10218017 | A  * | 8/1998 | | |
| JP | 2949825 | B2 * | 9/1999 | | |
| JP | 2014113931 | A  * | 6/2014 | | |
| JP | 2017109637 | A  * | 6/2017 | | |

* cited by examiner

*Primary Examiner* — Dennis H Pedder
(74) *Attorney, Agent, or Firm* — Global IP Counselors, LLP

(57) ABSTRACT

A vehicle body structure includes a floor assembly, a B-pillar assembly, a seatbelt tensioning mechanism, a seatbelt pre-tensioning device and a support bracket. The B-pillar assembly is attached to the floor assembly and extends upwardly from the floor assembly. The seatbelt tensioning mechanism is supported to the floor assembly adjacent to an intersection between the floor assembly and the B-pillar. The seatbelt pre-tensioning device is positioned adjacent to the seatbelt tensioning device. The support bracket is fixed to the B-pillar and the seatbelt pre-tensioning device.

18 Claims, 7 Drawing Sheets

VEHICLE BODY STRUCTURE

BACKGROUND

Field of the Invention

The present invention generally relates to a vehicle body structure. More specifically, the present invention relates to vehicle body structure that includes a support bracket that attaches to an outboard surface of an inboard panel of a B-pillar assembly, securing a seatbelt pre-tensioning device in position along an inboard side of the B-pillar assembly.

Background Information

As vehicles continuously undergo re-design to minimize overall size of the vehicle and maximize interior space within a passenger compartment, positioning and packaging vehicle features within the passenger compartment and within the vehicle body structure becomes more and more difficult.

SUMMARY

One object of the present disclosure is to provide a vehicle body structure with a support bracket that reinforces and strengthens a lower portion of a B-pillar assembly of the vehicle body structures.

Another object of the present disclosure is to provide a vehicle body structure with a support bracket dimensioned and shaped to rigid attach seatbelt components to a B-pillar assembly of the vehicle body structure.

In view of the state of the known technology, one aspect of the present disclosure is to provide a vehicle body structure with a floor assembly, a B-pillar assembly, a seatbelt tensioning mechanism, a seatbelt pre-tensioning device and a support bracket. The B-pillar assembly is attached to the floor assembly and extends upwardly from the floor assembly. The seatbelt tensioning mechanism is supported to the floor assembly adjacent to an intersection between the floor assembly and the B-pillar. The seatbelt pre-tensioning device is positioned adjacent to the seatbelt tensioning device. The support bracket is fixed to the B-pillar and the seatbelt pre-tensioning device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
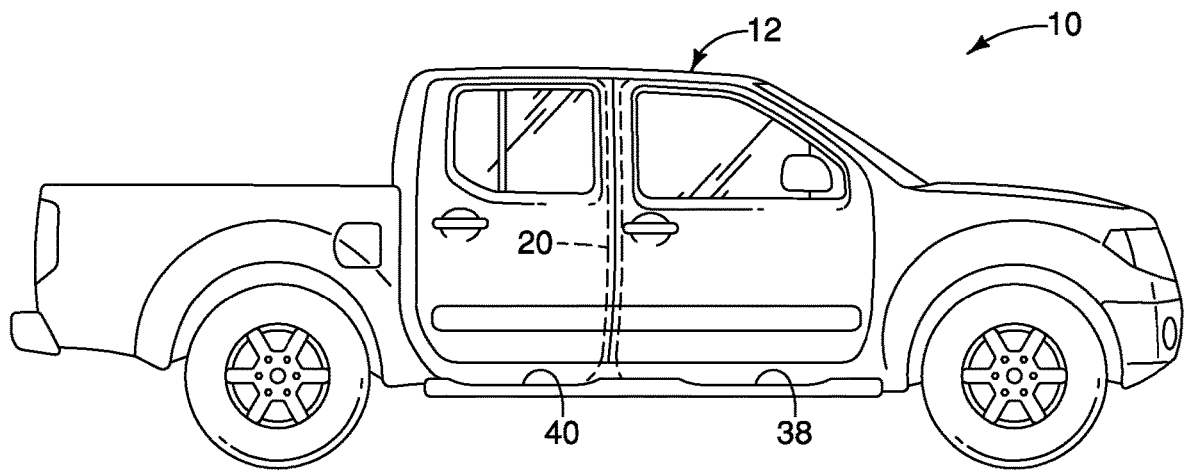
FIG. 1 is a side view of a vehicle having a vehicle body structure that includes a B-pillar structure and a support bracket that support a seatbelt tensioning mechanism, a seatbelt pre-tensioning device and a gusset bracket in accordance with an exemplary embodiment.

Referring initially to FIG. 1, a vehicle 10 that includes a vehicle body structure 12 is illustrated in accordance with a first embodiment. The vehicle body structure 12 includes a floor assembly 18 (FIGS. 2-5), a B-pillar assembly 20 (FIGS. 1-8), a seatbelt tensioning mechanism 22 (FIGS. 4, 5 and 7-9), a seatbelt pre-tensioning device 24 (FIGS. 4, 5 and 7-9), a gusset bracket 26 and a support bracket 28.

The floor assembly 18 includes a floor panel 32, floor stiffening portions 34 and 36 (FIG. 2), and, sill portions 38 and 40 (FIGS. 1-5). The floor panel 32 can be a single metallic plate member contoured to include various conventional floor panel contours or can be a plurality of panels welded together to define the floor panel 32. The floor stiffening portions 34 and 36 can be formed, via metal working such as a molding process, as part of the floor panel 32, or, can be separate structural elements welded to the floor panel 32.

Figure 2:
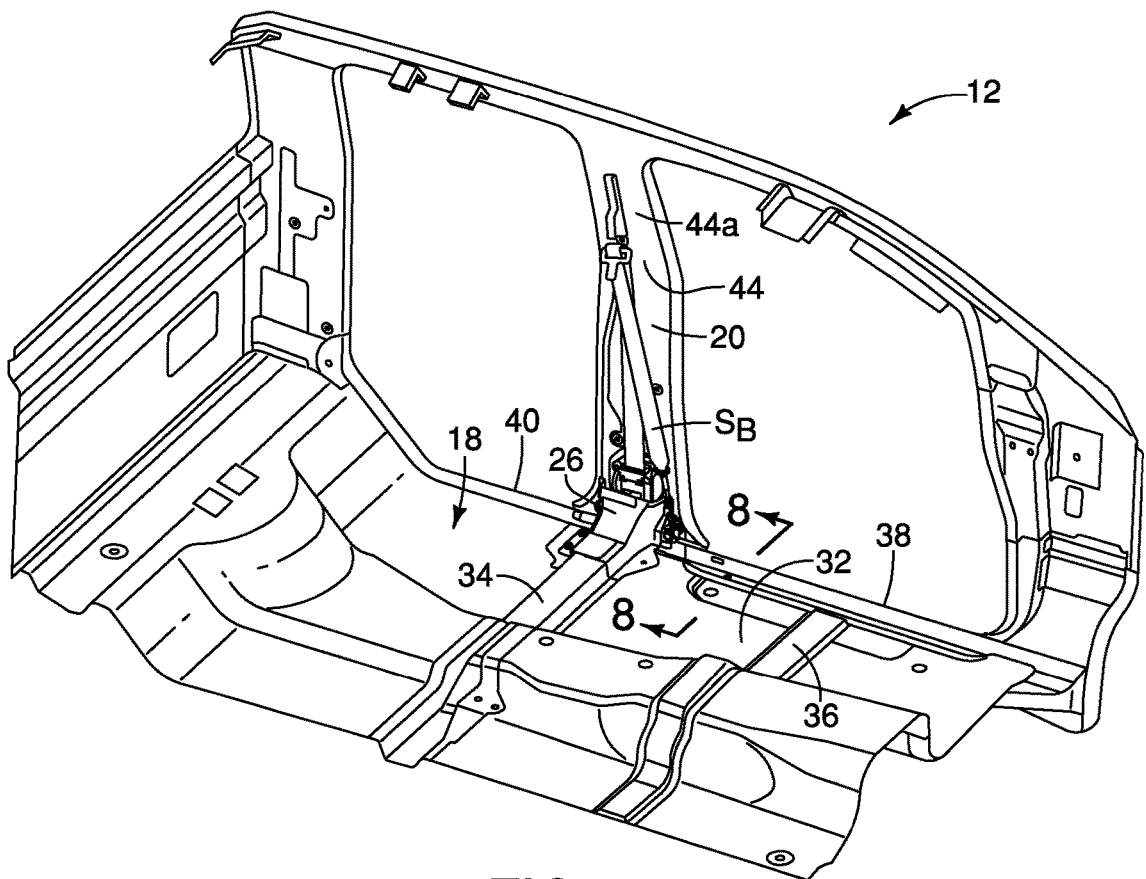
FIG. 2 is a perspective view of the vehicle body structure with trim components and structural elements removed showing interior surfaces of the B-pillar structure, a floor structure, the seatbelt tensioning mechanism, the seatbelt pre-tensioning device and the gusset bracket in accordance with the exemplary embodiment.

The floor stiffening portion 34 extends laterally side-to-side between the two B-pillar assemblies 20. The B-pillar assembly 20 shown in FIG. 2 is one of two B-pillar assemblies 20 located at opposite lateral sides of the vehicle 10. Since the B-pillar assemblies 20 are identical to one another (mirror images of one another), only one B-pillar assembly 20 is described herein below for the sake of brevity.

The B-pillar assembly 20 is attached to the floor assembly 18 by, for example, conventional welding techniques. The B-pillar assembly 20 extends upwardly from the floor assembly 18 to a roof assembly of the vehicle 10. The B-pillar assembly 20 includes a plurality of metal panels welded together for strength and rigidity. However, in the depicted embodiment, only an inboard panel 44 of the plurality of B-pillar assembly 20 is shown. Since multi-panel, or multi-layered B-pillar assemblies are conventional structures well known in the art, further description is omitted for the sake of brevity.

The inboard panel 44 of the B-pillar assembly 20 includes an inboard surface 44a and an outboard surface 44b. The inboard panel 44 further includes a lower contoured portion 44c proximate the floor assembly 18 that defines a first attachment area 48 and a second attachment area 50. The first attachment area 48 is above the second attachment area 50. The first attachment area 48 is also inboard of the second attachment area 50.

The first attachment area 48 is a generally flat or planar area of the outboard surface 44b of the inboard panel 44 of the B-pillar assembly 20. The second attachment area 50 is also a generally flat or planar area of the outboard surface 44b of the inboard panel 44 of the B-pillar assembly 20 that is parallel to the first attachment area 48. The second attachment area 50 is a dimple or convex area of the outboard surface 44b of the inboard panel 44. Consequently, the second attachment area 50 is located outboard of the first attachment area 48.

Figure 6:
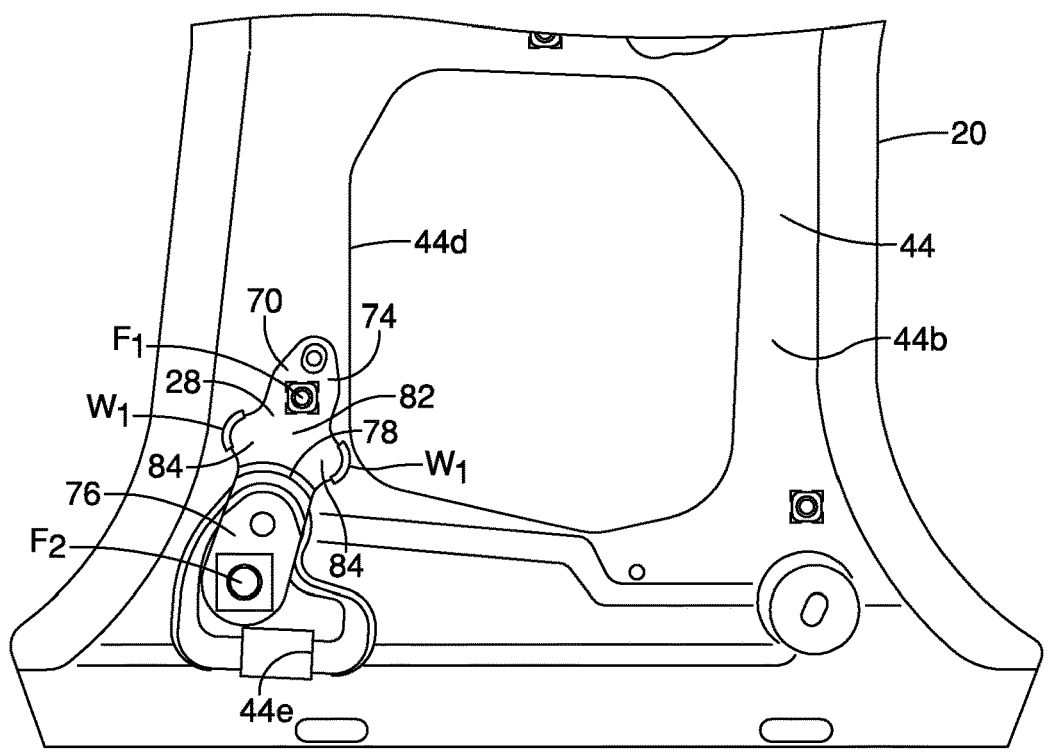
FIG. 6 is a side view of an outboard surface of an inboard panel of the B-pillar structure showing the support bracket attached thereto in accordance with the exemplary embodiment.
Figure 7:
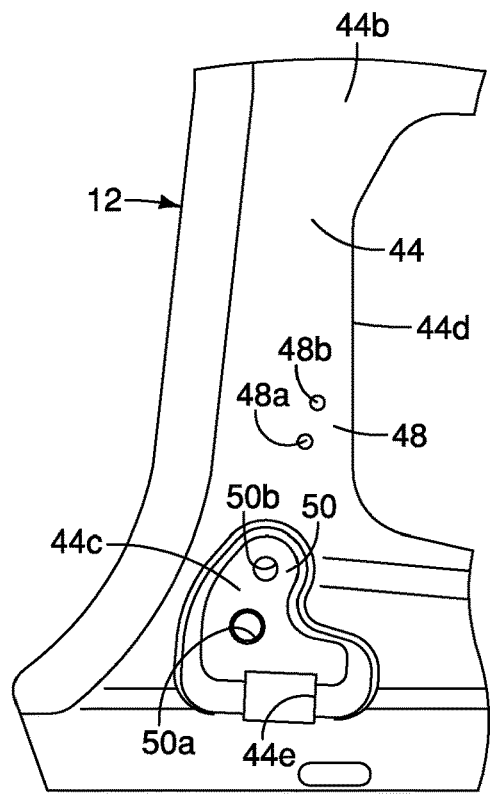
FIG. 7 is another side view of an outboard surface of the inboard panel of the B-pillar structure similar to FIG. 6 with the support bracket removed showing the surface contours of the inboard panel of the B-pillar along with fastener openings and alignment openings of the inboard panel in accordance with the exemplary embodiment.

As shown in FIGS. 6 and 7 and described in greater detail below, the first attachment area 48 and the second attachment area 50 are shaped and configured to receive the support bracket 28. The first attachment area 48 includes an opening 48a dimensioned to receive a fastener $F_1$ for fixing a portion of the gusset bracket 26 and fixing a portion of the support bracket 28 to the B-pillar assembly 20, as described further below. The second attachment area 50 includes an opening 50a dimensioned to receive a fastener $F_2$ for fixing a portion of the seatbelt pre-tensioning device 24 and fixing a portion of the support bracket 28 to the B-pillar assembly 20, as described further below.

The inboard panel 44 of the B-pillar assembly 20 further defines includes a first alignment opening 48b located above and adjacent to the opening 48a. As described further below, the first alignment opening 48b is used during the installation of the support bracket 28 for aligning an upper portion of the support bracket 28. The B-pillar assembly 20 also defines includes a second alignment opening 50b located above and adjacent to the opening 50a. As is also described further below, the second alignment opening 50b is used during the installation of the support bracket 28 for aligning a lower portion of the support bracket 28.

Figure 5:
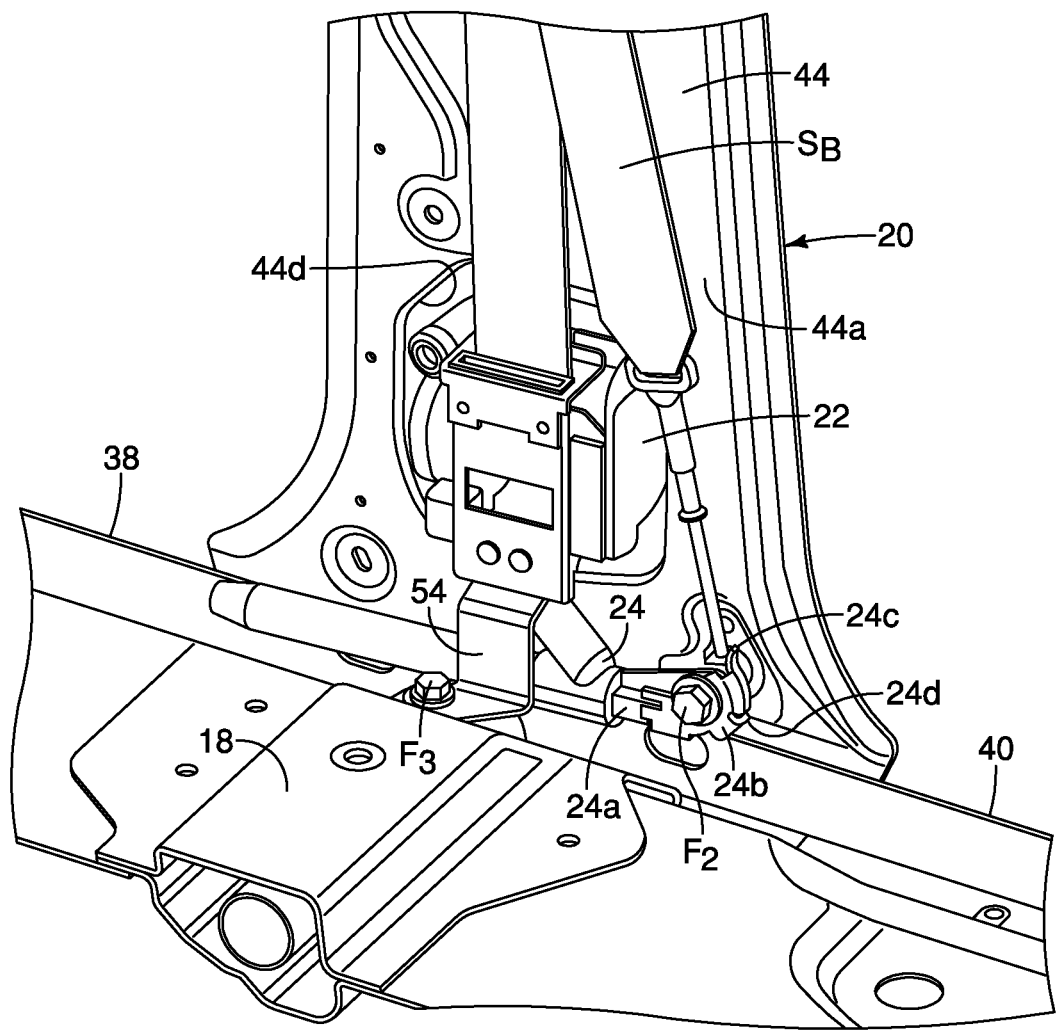
FIG. 5 is another perspective view of the portion of the vehicle body structure shown in FIG. 4 with the gusset bracket removed, showing the B-pillar structure, the floor structure, the seatbelt tensioning mechanism and the seatbelt pre-tensioning device in accordance with the exemplary embodiment.

The seatbelt tensioning mechanism 22 is a conventional vehicle component that is configured to tension a seatbelt SB during normal operation of the vehicle 10. As shown in FIG. 5, the seatbelt tensioning mechanism 22 is supported to the floor assembly 18 via a bracket 54 that is fixed to the floor assembly 18 via a fastener $F_3$ adjacent to an intersection between the floor assembly 18 and the B-pillar assembly 20. The seatbelt tensioning mechanism 22 is also fixed at its upper end to the B-pillar assembly 20 via fasteners (not shown) and/or projections (not shown) that extend to and are fixed to the B-pillar assembly 20 above the intersection between the floor assembly 18 and the B-pillar assembly 20.

Figure 3:
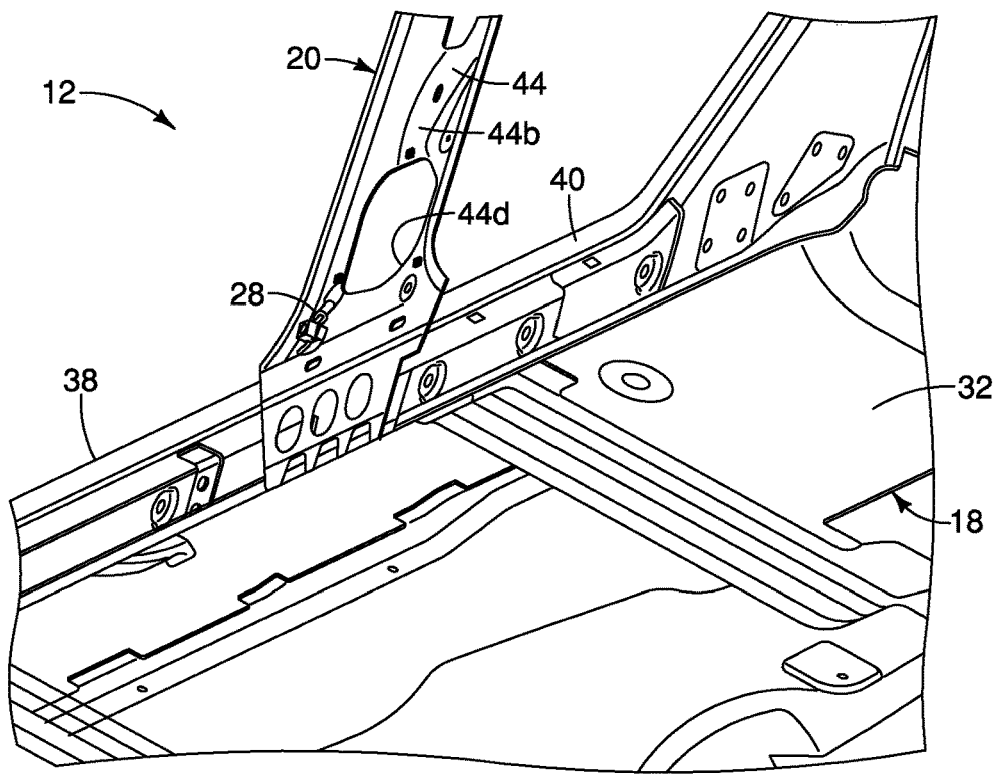
FIG. 3 is another perspective view of the vehicle body structure with trim components and structural elements removed showing exterior and lower surfaces of the B-pillar structure, the floor structure, and the support bracket in accordance with the exemplary embodiment.

As shown in FIGS. 3 and 6, the inboard panel 44 of the B-pillar assembly 20 includes a large opening 44d that extends from the inboard surface 44a to the outboard surface 44b. A portion of the seatbelt tensioning mechanism 22 extends through the opening 44d, as shown in FIGS. 4, 5 and 8-10.

The seatbelt pre-tensioning device 24 is a pyrotechnic lap pretensioner that is deployed in response to detection of an impact event. The seatbelt pre-tensioning device 24 is connected to an electronic controller (not shown) and at least one (or more) sensors that detect whether or not the vehicle 10 has experience an impact event, and if so, deploys the seatbelt pre-tensioning device 24. When the seatbelt pre-tensioning device 24 is deployed, a piston 24a (FIG. 5) is rapidly moved in a direction toward the right side of FIG. 5, thereby rapidly applying tension to the seatbelt SB, tightening the seatbelt SB and limiting movement of a passenger seated in the passenger seat (not shown) associated with the seatbelt SB.

The seatbelt pre-tensioning device 24 is shown as a pyrotechnic lap pretensioner (PLP) in the drawings. However, the seatbelt pre-tensioning device 24 can alternatively be an electromagnetically triggered device, such as a solenoid, or other mechanical device that can rapidly deploy and tighten the seatbelt SB in response to an impact event.

The seatbelt pre-tensioning device 24 is positioned within the passenger compartment of the vehicle 10 adjacent to the seatbelt tensioning device 22. More specifically, the seatbelt pre-tensioning device 24 is positioned adjacent the intersection of the floor assembly 18 and the inboard panel 44 of the B-pillar assembly 20. The seatbelt pre-tensioning device 24 includes a mounting bracket 24b that is fixedly attached the seatbelt pre-tensioning device 24. The mounting bracket 24b also includes a fastener receiving portion 24c and an anti-rotation projection 24d.

Figure 8:
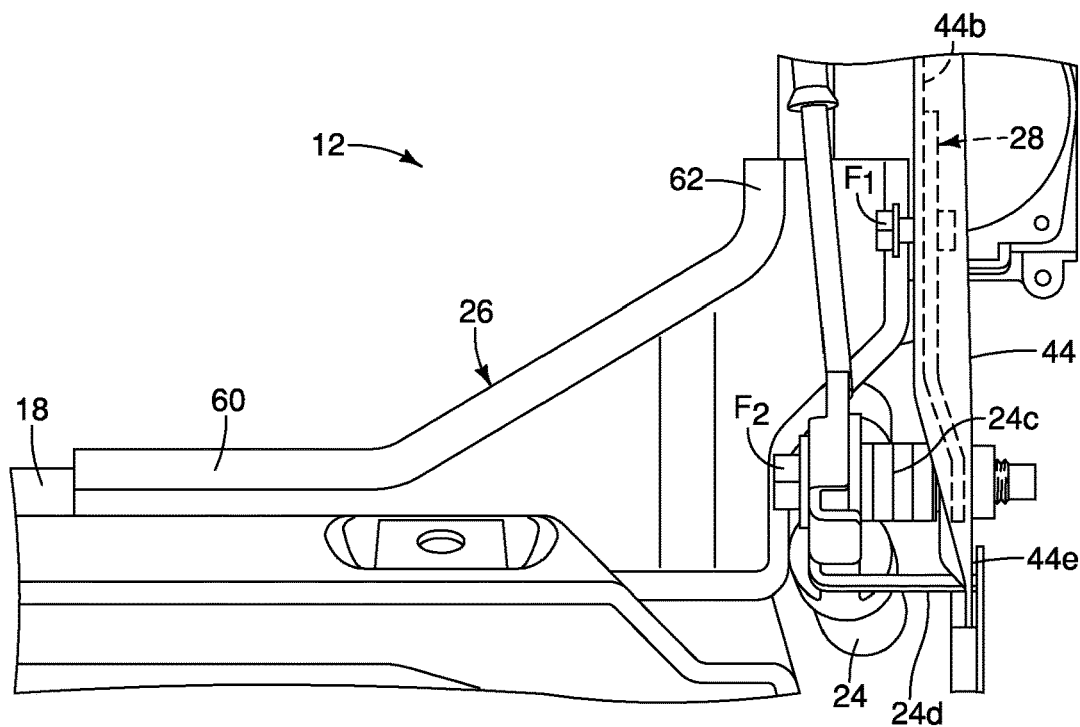
FIG. 8 is a front view cross-sectional of the vehicle body structure with sill structures below the B-pillar removed showing the gusset bracket, the inboard panel of the B-pillar and the floor structure with the seatbelt tensioning mechanism attached to the floor structure and the B-pillar structure and the seatbelt pre-tensioning device and the gusset bracket installed to the B-pillar structure via the support bracket in accordance with the exemplary embodiment.
Figure 9:
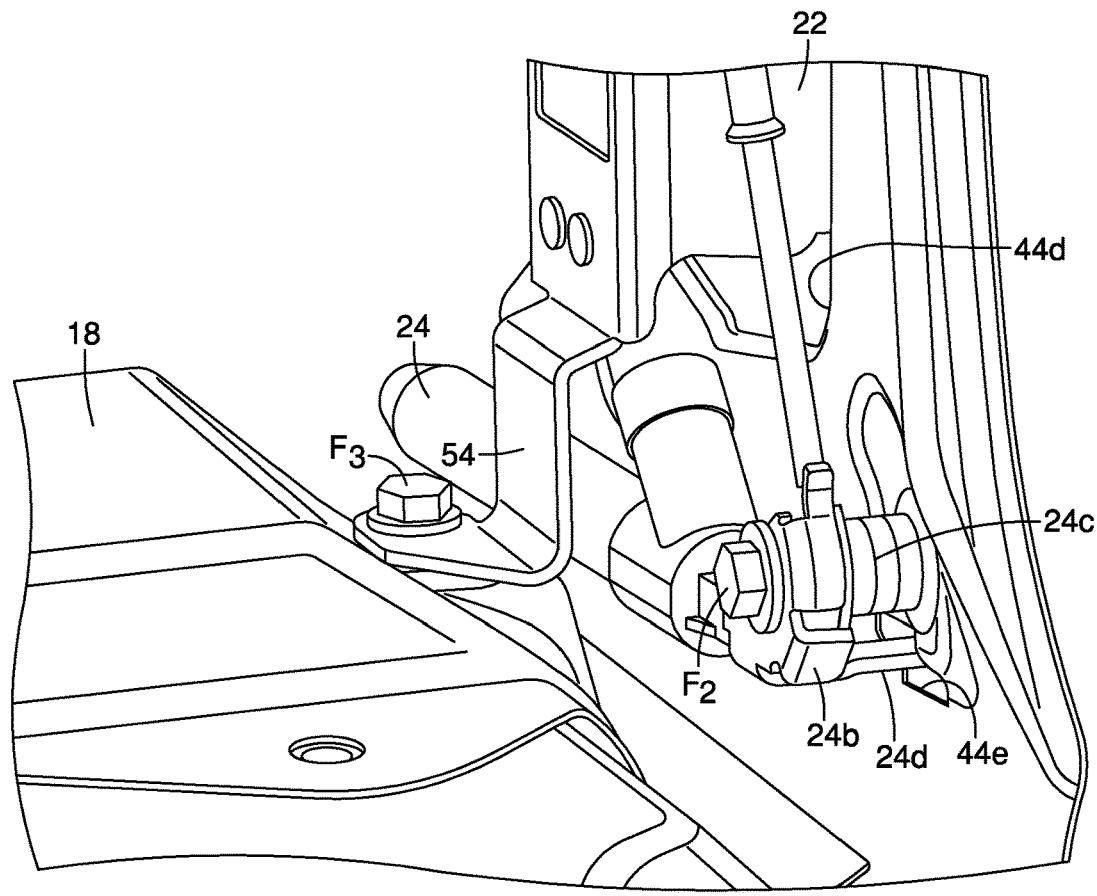
FIG. 9 is a perspective view of the portion of the vehicle body structure depicted in FIG. 8, with sill structures below the B-pillar removed showing the inboard panel of the B-pillar and the floor structure with the seatbelt tensioning mechanism and the seatbelt pre-tensioning device installed to the floor structure and/or the B-pillar structure in accordance with the exemplary embodiment.
Figure 10:
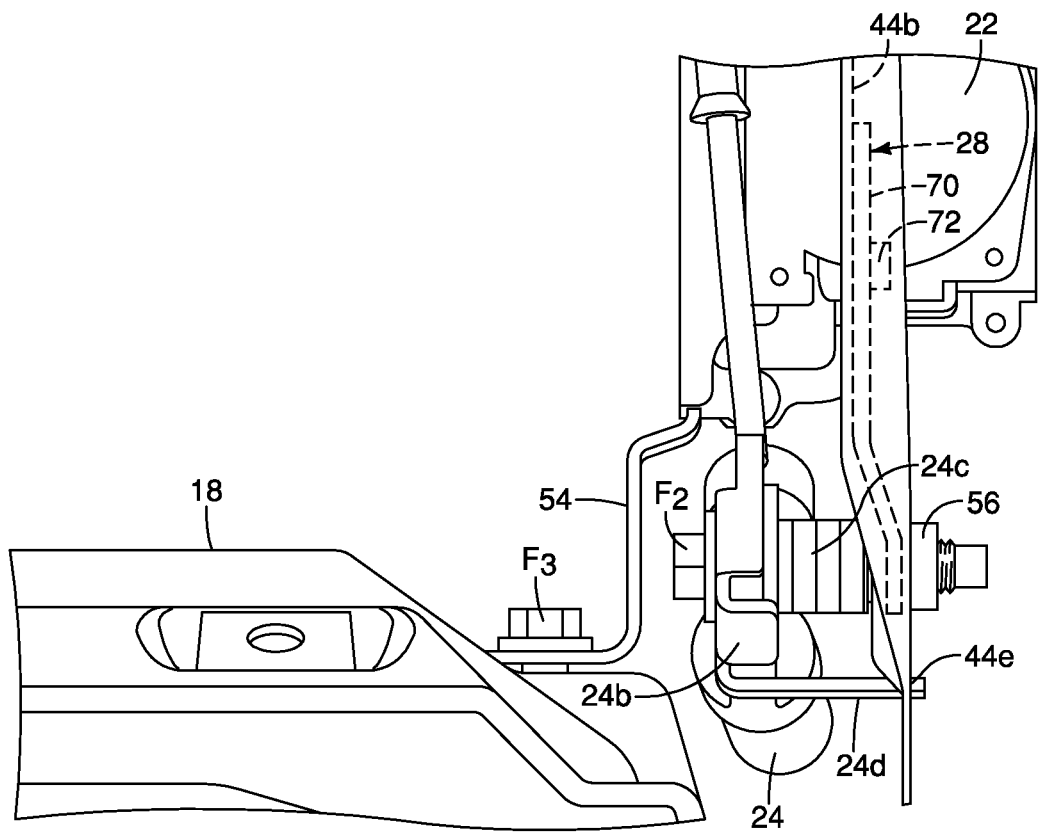
FIG. 10 is a front view cross-sectional of the vehicle body structure similar to FIG. 8 but with sill structures below the B-pillar and the gusset bracket removed showing the inboard panel of the B-pillar and the floor structure with the seatbelt tensioning mechanism attached to the floor structure and the seatbelt pre-tensioning device installed to the B-pillar structure via the support bracket in accordance with the exemplary embodiment.

As shown in FIGS. 8-10, the anti-rotation projection 24d extends through an anti-rotation opening 44e of the inboard panel 44 of the B-pillar assembly 20. Rotational movement of the mounting bracket 24b and the seatbelt pre-tensioning device 24 is prevented due to contact between the anti-rotation projection 24d and surfaces of the inboard panel 44 of the B-pillar assembly 20 that define the anti-rotation opening 44e.

The seatbelt pre-tensioning device 24 is held in a fixed orientation by the fastener $F_2$ that extends through an opening (not shown) in the mounting bracket 24b, an opening (not shown) in the seatbelt pre-tensioning device 24, the opening 50a in the inboard panel 44 of the B-pillar assembly 20 and a nut 56 welded to an outboard surface 28a of the support bracket 28. Together, the fastener $F_2$ and the anti-rotation projection 24d prevent rotation of the seatbelt pre-tensioning device 24 relative to the B-pillar assembly 20.

Figure 4:
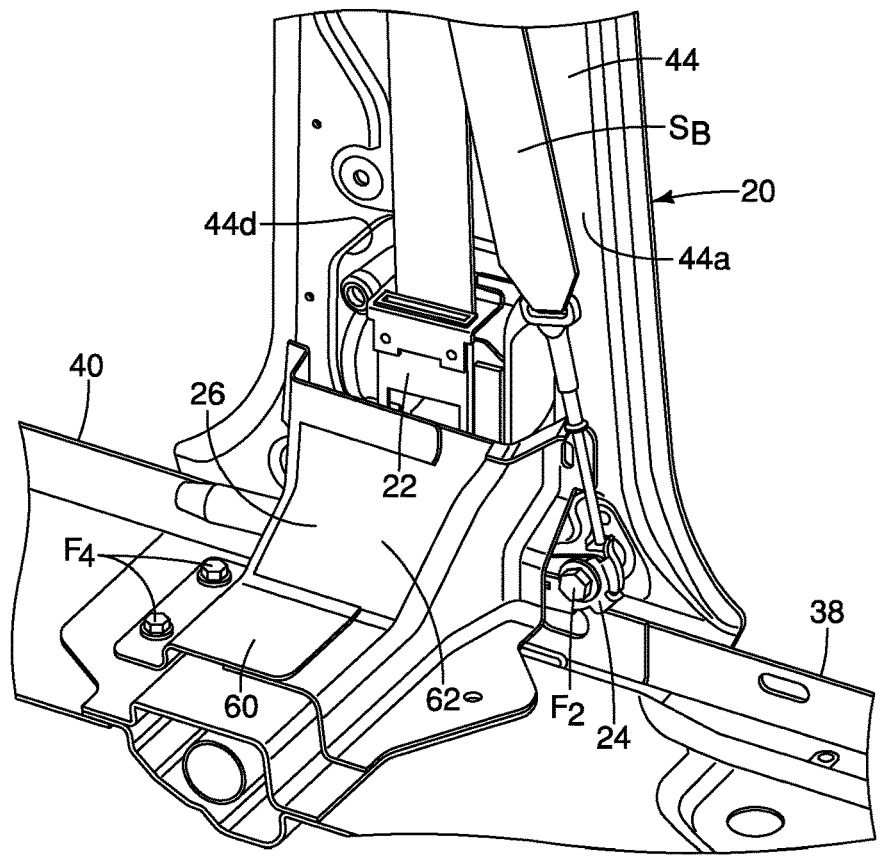
FIG. 4 is another perspective view of a portion of the vehicle body structure similar to FIG. 2 interior surfaces of the B-pillar structure, the floor structure, the gusset bracket, the seatbelt tensioning mechanism and the seatbelt pre-tensioning device in accordance with the exemplary embodiment.

As shown in FIGS. 4 and 8, the gusset bracket 26 has a first portion 60 and a second portion 62. The first portion 60 is installed to floor assembly 18 via mechanical fasteners $F_4$ at locations inboard of the seatbelt tensioning mechanism 22 and the seatbelt pre-tensioning device 24. The second portion 62 of the gusset bracket 26 extends upward from the first portion 60 in an outboard direction toward the B-pillar assembly 20 partially covering the seatbelt pre-tensioning device 24 and a portion of the seatbelt tensioning mechanism 22. The second portion 62 is attached to the inboard panel 44 of the B-pillar assembly 20 via at least the fastener $F_1$.

Figure 11:
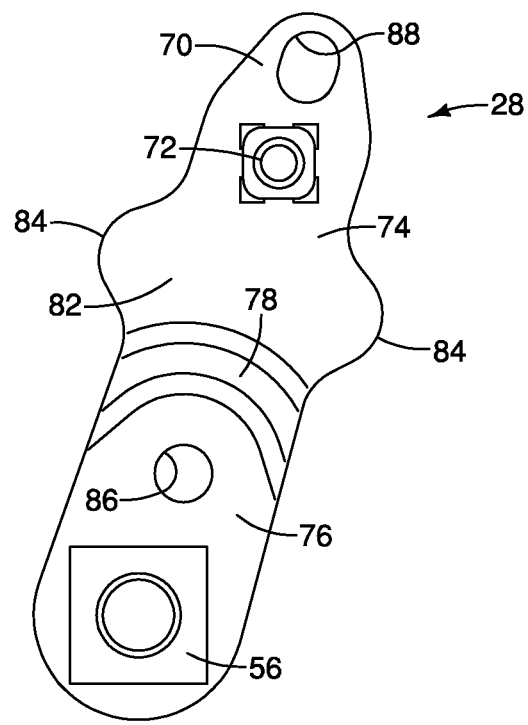
FIG. 11 is a plan view of the support bracket removed from the vehicle body structure, showing an upper end section, a lower end section and an offsetting contoured section therebetween, along with various attachment openings, and alignment openings in accordance with the exemplary embodiment.
Figure 12:
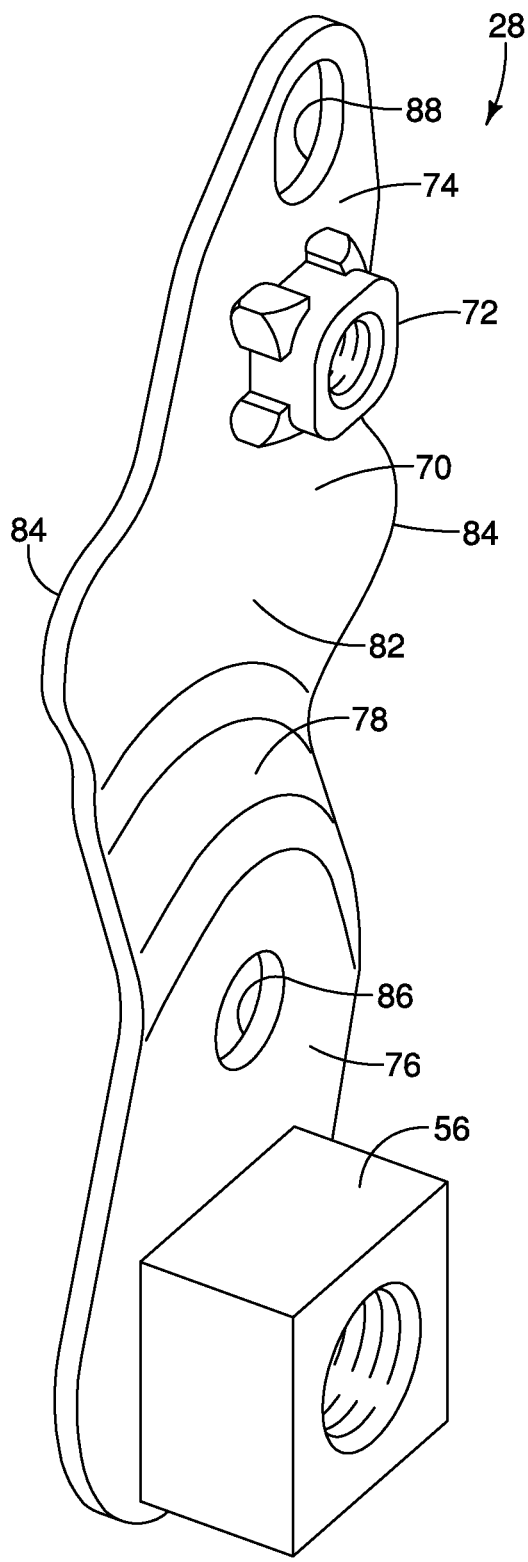
FIG. 12 is a perspective view of the support bracket removed from the vehicle body structure, showing the upper end section, the lower end section and the offsetting contoured section therebetween in accordance with the exemplary embodiment.
Figure 13:
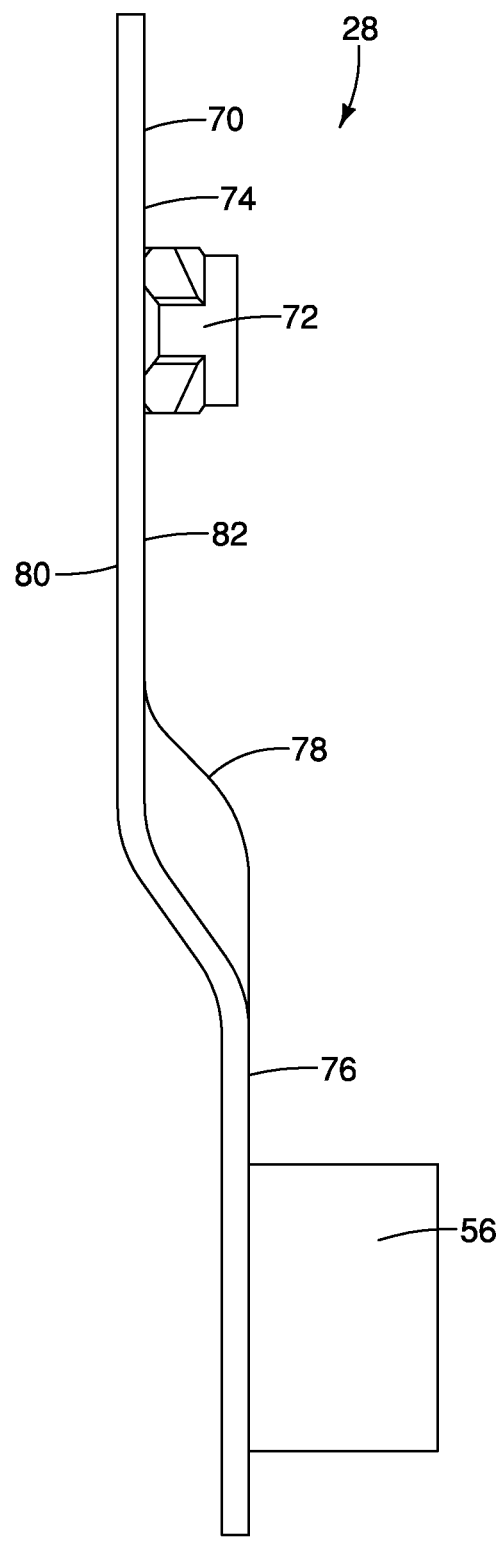
FIG. 13 is a side view of the support bracket of the support bracket showing the upper end section, the lower end section and the offsetting contoured section therebetween in accordance with the exemplary embodiment.

A description of the support bracket 28 is now provided with specific reference to FIGS. 3, 6, 8 and 10-13. As shown in FIGS. 11-13, the support bracket 28 includes a main plate 70, the nut 56 and a nut 72. The main plate 70 includes an upper end section 74, a lower end section 76, a contoured section 78, and inboard surface 80, an outboard surface 82 and symmetrical wings 84. As shown in FIGS. 12 and 13, the portion of the outboard surface 82 that defines the upper end section 74 is generally planar. Similarly, the portion of the outboard surface 82 that defines the lower end section 76 is also generally planar. The upper end section 74 and the lower end section 76 extend in direction parallel to one another with the lower end section 76 being located outboard of the upper end section. The contoured section 78 (also referred to as an offset section) has a curved shape, as viewed in FIG. 11 and defines an offset that extends between the plane defined by the upper end section 74 and the plane defined by the lower end section 76.

The portion of the outboard surface 82 that defines the upper end section 74 includes a nut 72 that is welded to the outboard surface 82 and is aligned with an opening in the main plate 70 that is positioned and dimensioned to receive the first fastener $F_1$, as shown in FIG. 8. The portion of the outboard surface 82 that defines the lower end section 76 includes the nut 56 that is welded to the outboard surface 82 and is aligned with an opening in the lower end section 76 of the main plate 70 that is positioned and dimensioned to receive the second fastener $F_2$, as is also shown in FIG. 8.

The support bracket 28 is fixed to the B-pillar assembly 20, the gusset bracket 26 and the seatbelt pre-tensioning device 22 as follows.

First, the seatbelt pre-tensioning device 22 is placed adjacent to the inboard surface 44a of the inboard panel 44 of the B-pillar assembly 20. During this step, the anti-rotation projection 24d is inserted into the anti-rotation opening 44e in the inboard panel 44. Next, an alignment pin (not shown) or other long cylindrically shaped object is inserted into the second alignment opening 50b of the second attachment area 50 of the inboard panel 44 of the B-pillar assembly 20. Prior to or thereafter inserting the alignment pin into the second alignment opening 50b, the support bracket 28 is put into position along the outboard surface 44b of the inboard panel 44 with the alignment pin extending through the alignment opening 86 of the lower end section 76 of the support bracket 28. Thereafter, the fastener $F_2$ is inserted through an opening in the fastener receiving portion 24c of the seatbelt pre-tensioning device 24 with spacers or thick washers in position on the fastener 24 with spacers or thick washers in position on the fastener $F_2$ between the inboard surface 44a of the inboard panel 44 and the for proper positioning of the fastener receiving portion 24c of the seatbelt pre-tensioning device 24. The fastener $F_2$ is further pushed through the opening 50a of the inboard panel 44 and threaded into the nut 56 of the support bracket 28.

Thereafter, the gusset bracket 26 is positioned with the second portion 62 resting against the inboard surface 44a of the inboard panel 44 of the B-pillar assembly 20. The alignment pin (not shown) is inserted through an opening (not shown) in the second portion 62 of the gusset bracket 26, then inserted into the first alignment opening 48b in the inboard panel 44 of the B-pillar assembly 20, then into the alignment slot 88 of the support bracket 28 to angularly align the upper end section 74 of the support plate 28 such that the fastener $F_1$ is inserted through the opening (not shown) in second portion 62 of the gusset bracket 26, through the first alignment opening 48b in the inboard panel 44 and then threaded into the nut 72 of the support bracket 28. Once the fasteners $F_1$ and $F_2$ are tightened to a pre-determined torque setting, the support bracket 28, the second portion 62 of the gusset bracket 26 and the seatbelt pre-tensioning device 24 are fixed in position to the B-pillar assembly 20.

Once the support bracket 26 is fixed in position, the symmetrical wings 84 can be welded via welds Wi to the outboard surface 44b of the inboard panel 44 of the B-pillar assembly 20.

Consequently, once fully installed, the upper end section 74 overlays and is in direct contact with the first attachment area 48 (a flat surface area) of the inboard panel 44 of the B-pillar assembly 20. Further, the lower end section 76 of the support bracket 28 overlays and is in direct contact with the second attachment area 50 (a flat surface area) of the inboard panel 44 of the B-pillar assembly 20.

The contoured section 78 of the support bracket 28 defines an offset area that bridge the horizontal gap between the upper end section 74 and the lower end section 76 of the support bracket 28.

The support bracket 28 provides a convenient way to attached both the gusset bracket 26 and the seatbelt pre-tensioning device 24 to the B-pillar assembly 20 without using up valuable space within the passenger compartment of the vehicle 10. Further the support bracket 28 is provided with sufficient thickness that the support bracket 28 reinforces the B-pillar assembly 20 in the area adjacent to the opening 44d. As discussed above, the opening 44d is provided to receive a portion of the seatbelt tensioning mechanism 22. Therefore, the support bracket 28 provides reinforcement to the B-pillar assembly 20 in order to ensure sufficient space to position the seatbelt tensioning mechanism 22 in a convenient and space conscious location.

The various vehicle structural elements of the vehicle 10 other than the support bracket 28 and associated components, are conventional components that are well known in the art. Since these vehicle structural elements are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired.

Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
a floor assembly;
a B-pillar assembly that is attached to the floor assembly and extends upwardly from the floor assembly, the B-pillar assembly including an inboard panel with an inboard surface and an outboard surface;
a seatbelt tensioning mechanism supported to the floor assembly adjacent to an intersection between the floor assembly and the B-pillar;
a seatbelt pre-tensioning device positioned adjacent to the seatbelt tensioning device; and
a support bracket fixed to the B-pillar and the seatbelt pre-tensioning device, the support bracket being located along the outboard surface and the seatbelt pre-tensioning device being located along the inboard surface.

2. The vehicle body structure according to claim 1, wherein
the inboard panel of the B-pillar includes a lower contoured portion proximate the floor assembly, the lower contoured portion defining a first attachment area and a second attachment area, the first attachment area being above the second attachment area, and the first attachment area being inboard of the second attachment area.

3. The vehicle body structure according to claim 2, wherein
the support bracket has an upper end and a lower end, the upper end being attached to the first attachment area of the B-pillar and the lower end being fixed to the second attachment area and the seatbelt pre-tensioning device.

4. The vehicle body structure according to claim 3, wherein
the B-pillar includes a first alignment opening and the support bracket includes a second alignment opening such that during installation of the support bracket with the first and second alignment openings aligned, the lower end of the support bracket aligns with second alignment area.

5. The vehicle body structure according to claim 3, wherein
the support bracket further including an offset area between the upper end and the lower end of the support bracket such that when installed to the B-pillar, the upper end is inboard of the lower end.

6. The vehicle body structure according to claim 3, wherein
the seatbelt pre-tensioning device and the lower end of the support bracket are fixed to one another via a mechanical fastener.

7. The vehicle body structure according to claim 1, wherein
the support bracket has an upper end and a lower end, the upper end being fixed to the B-pillar via a mechanical fastener and the lower end being fixed to the seatbelt pre-tensioning device via another mechanical fastener.

8. The vehicle body structure according to claim 1, wherein
the seatbelt tensioning mechanism is attached to the floor assembly adjacent to B-pillar assembly.

9. The vehicle body structure according to claim 1, further comprising
a gusset bracket having a first portion and a second portion, the first portion being installed to floor assembly inboard of the seatbelt tensioning mechanism and the seatbelt pre-tensioning device, the second portion of the gusset bracket extending upward in an outboard direction to the B-pillar assembly partially covering the seatbelt pre-tensioning device, and
the support bracket having an upper end and a lower end, the upper end being fixed to the B-pillar and the second portion of the gusset bracket, and, the lower end being fixed to the seatbelt pre-tensioning device.

10. The vehicle body structure according to claim 1, wherein
the seatbelt pre-tensioning device is a pyrotechnic lap pretensioner.

11. The vehicle body structure according to claim 1, wherein
the B-pillar includes a first alignment opening and the support bracket includes a second alignment opening.

12. A vehicle body structure, comprising:
a floor assembly;
an inboard panel of a B-pillar assembly attached to the floor assembly and extending upwardly from the floor assembly, the inboard panel of the B-pillar assembly having an inboard surface and an outboard surface, the inboard panel of the B-pillar includes a lower contoured portion proximate the floor assembly, the lower contoured portion defining a first attachment area and a second attachment area, the first attachment area being above the second attachment area, and the first attachment area being inboard of the second attachment area;

a seatbelt pre-tensioning device positioned adjacent an intersection of the floor assembly and the inboard panel of the B-pillar assembly;

a gusset bracket having a first portion and a second portion, the first portion being installed to floor assembly inboard of the seatbelt pre-tensioning device, the second portion of the gusset bracket extending upward in an outboard direction to the inboard surface of the inboard panel of the B-pillar assembly partially covering the seatbelt pre-tensioning device; and a support bracket attached to second portion of the gusset bracket and attached to the seatbelt pre-tensioning device.

13. The vehicle body structure according to claim 12, wherein the support bracket has an upper end and a lower end, the upper end being fixed to the first attachment area of the B-pillar and the gusset bracket and the lower end being fixed to the second attachment area and the seatbelt pre-tensioning device.

14. The vehicle body structure according to claim 13, wherein the support bracket further including an offset area between the upper end and the lower end of the support bracket such that when installed to the B-pillar, the upper end is inboard of the lower end.

15. The vehicle body structure according to claim 12, further comprising a seatbelt tensioning mechanism supported to the floor assembly adjacent to an intersection between the floor assembly and the B-pillar.

16. A vehicle body structure, comprising:

a floor assembly;

an inboard panel of a B-pillar assembly attached to the floor assembly and extending upwardly from the floor assembly, the inboard panel of the B-pillar assembly having an inboard surface and an outboard surface, the B-pillar includes a first alignment opening;

a seatbelt pre-tensioning device positioned adjacent an intersection of the floor assembly and the inboard panel of the B-pillar assembly;

a gusset bracket having a first portion and a second portion, the first portion being installed to floor assembly inboard of the seatbelt pre-tensioning device, the second portion of the gusset bracket extending upward in an outboard direction to the inboard surface of the inboard panel of the B-pillar assembly partially covering the seatbelt pre-tensioning device; and a support bracket attached to second portion of the gusset bracket and attached to the seatbelt pre-tensioning device, the support bracket including a second alignment opening such that during installation of the support bracket with the first and second alignment openings aligned, the lower end of the support bracket aligns with second alignment area.

17. The vehicle body structure according to claim 16, wherein the support bracket includes an upper alignment slot configured for use during installation of the support bracket to the B-pillar for angular alignment of the support bracket.

18. The vehicle body structure according to claim 17, wherein the support bracket includes a pair of laterally extending wings such that with the support bracket aligned in position relative to the B-pillar the pair of laterally extending wings are welded to the B-pillar.

* * * * *